UNITED STATES PATENT OFFICE.

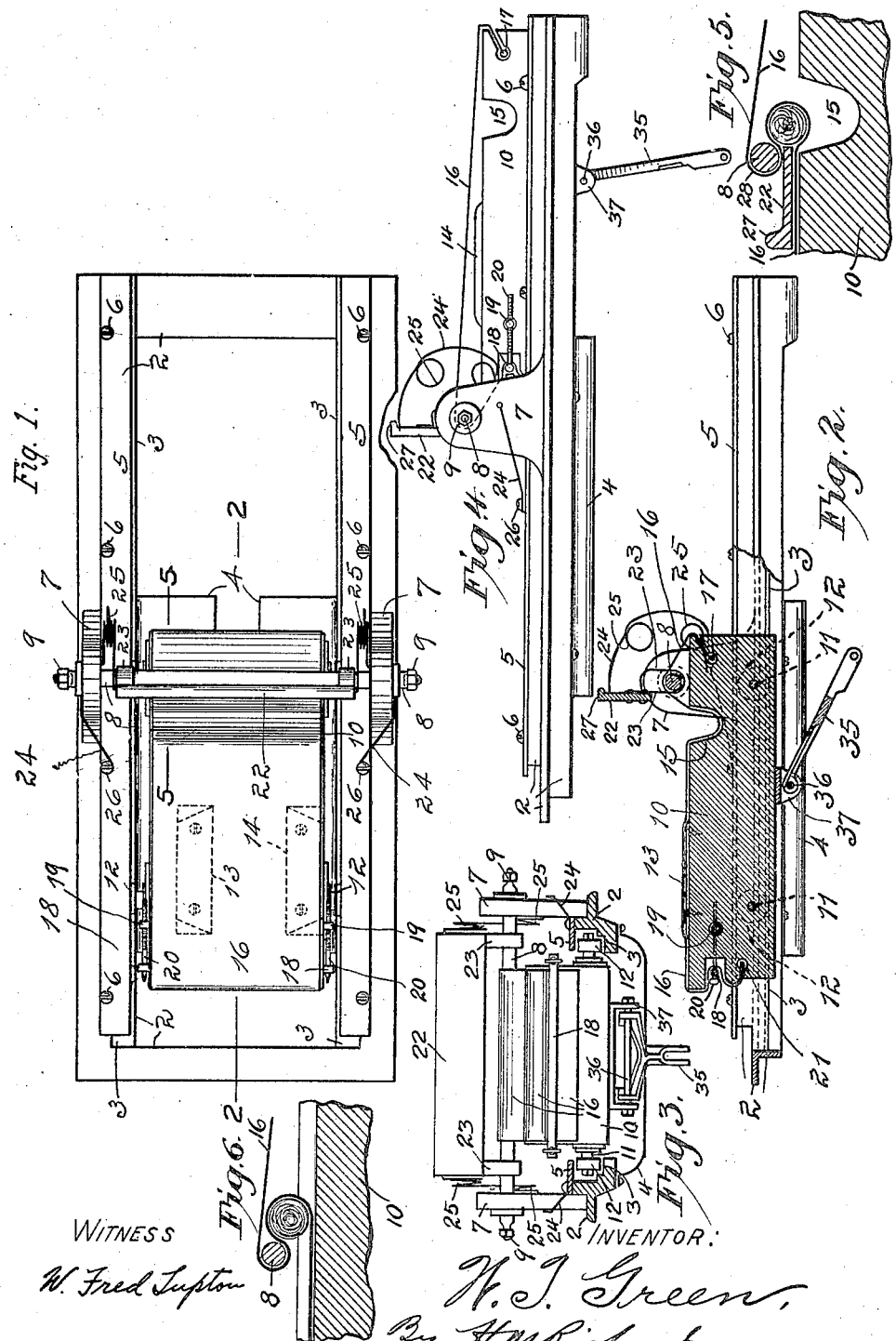

WALTER T. GREEN, OF GALESBURG, ILLINOIS.

CIGAR-BUNCH-MAKING MACHINE.

1,302,153.  Specification of Letters Patent.  Patented Apr. 29, 1919.

Application filed May 3, 1918. Serial No. 232,340.

*To all whom it may concern:*

Be it known that I, WALTER T. GREEN, a citizen of the United States, and a resident of Galesburg, in the county of Knox and State of Illinois, have invented a new and useful Cigar-Bunch-Making Machine, of which the following is a specification.

My invention relates to devices for rolling and shaping the fillers and binders of cigars.

One of the objects of the invention is to provide for equal compression, throughout its length, of the "bunch," by which term I shall hereinafter designate the filler and binder.

Another object is to provide novel means whereby the bunch may be given any suitable shape.

Another object is to provide for the making of a bunch of any predetermined length.

It is an object to provide a machine the use of which will aid a beginner to learn the art of rolling cigars.

A still further object is to provide devices which will roll the bunch more compactly than heretofore, whereby to cause it to draw more smoothly and to burn more evenly.

The invention consists, substantially, in the improvements herein described.

In the accompanying drawings:

Figure 1 is a top plan of a machine in which my improvements are incorporated, the carriage being shown in position ready for operation;

Fig. 2, a longitudinal section, taken in the line 2—2 in Fig. 1;

Fig. 3, a front elevation, partly in section;

Fig. 4, a side elevation, the carriage being shown at the other end of its movement from that shown in Fig. 1;

Fig. 5, a longitudinal sectional detail, and

Fig. 6, a section, but the carriage advanced almost to the position shown in Fig. 4.

Considering the drawings in detail, 2 designates a frame which includes a pair of track-rails 3. 4 denotes a guard or shield secured to and underneath the frame. 5—5 designate a pair of straps overlying and suitably spaced from the rails 3 and preferably secured to the frame by screws 6. Approximately at its midlength each side bar of the frame is provided with an ear 7, these being provided with registering apertures for the reception of a shaft 8 having constricted threaded ends each of which is engaged by a nut 9.

10 indicates a carriage carrying stub-axles 11 on which are mounted wheels 12 traversing the rails 3. The carriage body is preferably formed from a block of wood the upper front portion of which constitutes a work-board. Near each side of the work-board is a shaping and sizing block 13, 14, both of which are removable and adapted for different positions on the board from those shown. Also they are preferably of different sizes and shapes, in order that the head and tuck ends of the bunch may be made into the shape (taper) desired. Being adapted for different positions transversely of the board they may be so positioned that a bunch of any desired length, within limits, may be made. 15 designates a deep transverse recess or groove cut in the upper portion of the carriage body. 16 denotes a belt, secured at its rear end to the carriage by inserting it through a transversely cut slit and eye 17, and at its front end adjustably secured to the carriage (in order to adapt the length of the belt to the circumference of the cigar-bunch which it is desired to make) by means of a cross-bar 18, cross-bar 19 and adjusting-screws 20, the front terminal of the belt being held in a slit and eye 21. Normally, it is to be noted, the belt lies quite loose, in order that it may be pushed down into the groove 15.

22 designates a gate or closure, wherein resides perhaps the most important feature of the invention. I have shown it as secured to a pair of loops 23 each of which loosely embraces the shaft 8 and is free to either rotate or have endlong movement thereon. To each side of the gate is secured one end of a gate-return spring 24 having coils 25, the body of each spring running through a small aperture in the adjacent ear 7 and is secured by a screw 26 to one of the plates 5. Projecting rearwardly from the upper portion of the gate is a lip 27.

It will be quite evident, of course, that numerous detail changes may be made, especially in the gate and the parts with which it coöperates, without departing from the spirit of the invention.

The operation is as follows:

The carriage having been drawn to its forward position, as shown in Figs. 1 and 2, the operator will place a binder in position on top of the belt, its front edge extending preferably over the filler pocket or groove 15, which constitutes also a means whereby both the circumference and length of the bunch may be determined. The filler, which the operator has already "broke" or torn to suitable length and size, is then laid upon the somewhat snugly drawn belt, immediately above the groove 15, and pressed down upon by the fingers of the operator. In so doing he will force the belt down into the groove and this will cause the carriage to move rearwardly a slight distance. The operator will then push the carriage further rearward. As it so travels, the belt will tend to wrap around and draw the filler upward, thus rolling and compressing it, simultaneously lifting it out of the groove. This movement is occasioned in part from the fact that the roller or shaft 8, which is held from all movement other than rotary, holds a portion, numbered 28 in Fig. 5, from movement. This, as shown in said figure, compresses the filler into an almost but not quite complete cylinder, and the compression will have been uniform except at the front edge, shown between the work-board and the roller, same figure. This, however, is not sufficient for best results. Therefore, the operator will then move the gate to the position shown in Fig. 5, forcing its rear edge against the only part of the filler which has not been tightly compressed, completing the cylinder, and preventing all danger of any part of the filler from being drawn out of position. The gate is now to be released, whereupon the springs will restore it to normal position. As the carriage continues to move rearward—it being noted that the gate aided in holding the filler in place until it had reached the horizontal plane of the work-board surface, and that the gate was not released until after the binder had started upon the filler—the action will be as indicated in Fig. 6, i. e., the loop 29 in said figure will roll the binder snugly upon the filler; and this will be continued until the carriage reaches the rear limit of its movement, at which time the bunch will be discharged at the front end, easy of access to the operator. After the binder has been given substantially one complete turn around the filler, as above described, the bunch will pass onto the shapers 13 and 14, and as the belt is drawing tautly upon the bunch the head and tuck end-portions of the latter will be compressed and shaped to accord with the size and shape of the shapers.

The carriage may be moved back and forth in any suitable manner. In Fig. 3 I have shown a link 35 hinged by means of a pin or bolt 36 to a block 37 secured to the lower face of the carriage block. This is adapted for the engagement of either foot or motor power, but inasmuch as it does not particularly concern my improvements it requires no further description.

Having thus described the nature of the invention and having shown a practical and efficient machine for carrying it into effect, I claim the following, to-wit:

1. In a machine of the class described, a carriage having a transversely arranged groove in its upper surface, a compressor-belt overlying said surface and adapted to be depressed into said groove, a transversely arranged element adapted to be engaged by the belt whereby to take up a portion of the latter, and an element adapted to be moved into a filler-compressing position between the carriage and said transversely arranged element.

2. In a machine of the class described, a carriage having a transversely arranged groove in its upper surface, a compressor-belt overlying said surface and adapted to be depressed into said groove, a transversely arranged roller adapted to be engaged by the belt whereby to take up a portion of the latter, and a gate-like element adapted to be moved into a filler-compressing position between the carriage and roller.

3. In a machine of the class described, a carriage having a transversely arranged groove in its upper surface, a compressor-belt overlying said surface and adapted to be depressed into said groove, a transversely arranged roller adapted to be engaged by the belt whereby to take up a portion of the latter, a gate-like element adapted to be moved into a filler-compressing position between the carriage and roller, and means for returning the gate-like element to normal position.

In testimony whereof I hereunto sign my name this 16th day of April, 1918.

WALTER T. GREEN.

Copies of this patent may be obtained for five cents each, by addressing the "Commissioner of Patents, Washington, D. C."